US009301535B1

(12) United States Patent
Beearg et al.

(10) Patent No.: US 9,301,535 B1
(45) Date of Patent: Apr. 5, 2016

(54) EQUIPMENT AND METHODS TO DRY SUGAR BEET PULP AND OTHER PRODUCTS

(71) Applicants: Brian Bearg, Oakdale, CA (US); Aric Bearg, Oakdale, CA (US)

(72) Inventors: Brian Bearg, Oakdale, CA (US); Aric Bearg, Oakdale, CA (US)

(73) Assignee: SOLAR EQUIPMENT CORPORATION, Oakdale, CA (US)

( * ) Notice: Subject to any disclaimer, the term of this patent is extended or adjusted under 35 U.S.C. 154(b) by 140 days.

(21) Appl. No.: 14/337,140

(22) Filed: Jul. 21, 2014

(51) Int. Cl.
*F26B 19/00* (2006.01)
*A23B 7/028* (2006.01)
*F26B 25/06* (2006.01)

(52) U.S. Cl.
CPC ............... *A23B 7/028* (2013.01); *F26B 25/063* (2013.01)

(58) Field of Classification Search
CPC ......... F26B 19/00; F26B 21/00; A01D 57/00; A01D 57/20; Y10S 56/00; Y10S 56/21
USPC ................ 34/387, 235; 56/364, 370; 198/842
See application file for complete search history.

(56) References Cited

U.S. PATENT DOCUMENTS 3,141,284 A * 7/1964 Reynolds ............... A01D 57/30 56/12.7
3,178,876 A 4/1965 Lundberg
3,362,085 A * 1/1968 Clifford .................... B60P 1/34 105/269
D211,958 S * 8/1968 Hesston et al. ................ D15/27
3,496,713 A * 2/1970 Reinhardt .............. A01D 29/00 171/101
3,626,601 A * 12/1971 Moore .................... F26B 9/103 34/232
3,884,022 A 5/1975 Landolt
4,101,081 A * 7/1978 Ritter ................... A01D 90/083 241/101.74
4,166,505 A * 9/1979 West ...................... A01D 29/00 171/1
D261,889 S * 11/1981 Cicci ............................. D15/26
4,471,605 A * 9/1984 Ender, Sr. .............. A01D 57/28 171/101
4,604,815 A * 8/1986 Ridgway ............... F26B 25/063 34/201
4,730,447 A 3/1988 Fisher et al.
4,738,092 A 4/1988 Jennings
4,748,803 A 6/1988 MacMaster et al.
D306,737 S * 3/1990 VanGinhoven ................ D15/27
4,905,466 A 3/1990 Heppner
5,450,717 A * 9/1995 Delperdang ........... A01D 84/00 56/366
5,557,859 A * 9/1996 Baron ...................... F26B 3/286 34/102
5,664,338 A * 9/1997 Thom, Jr. .............. F26B 25/008 198/952
5,675,905 A * 10/1997 Hougham ................. F26B 5/08 210/361
5,675,910 A * 10/1997 Norris ..................... F26B 17/08 34/378
5,904,035 A * 5/1999 Bleacher ................ A01D 84/00 56/365
5,930,911 A * 8/1999 Alward ............... B05B 15/1207 34/666
6,125,622 A * 10/2000 Brackebusch ......... A01D 84/00 56/365

(Continued)

FOREIGN PATENT DOCUMENTS

DE 3014384 A1 * 10/1981 ........... A01B 73/067
GB 470075 A * 8/1937 ........... A01D 43/077
GB 1328377 A * 8/1973 .............. F26B 17/02

*Primary Examiner* — Stephen M Gravini
(74) *Attorney, Agent, or Firm* — Steven A. Nielsen; www.NielsenPatents.com

(57) ABSTRACT

A system of drying agricultural products may include a spreader trailer system 100, a windrow construction system or cultivator system 200, a fluffer or aeration system 300, a drag bar system 400, a wide row maker system 500, a conveyer collection system 600 and a collection truck 640. A spreader trailer uses a plurality of chains or other belt drive systems 137 to move a plurality of flat conveyer bars 135 toward spinning breakup tines 157. The breakup tines allow the agricultural product to fall down upon a plurality of rotational plates 160 that disperse the product over an asphalt surface. Windrows over asphalt allow the product to heat at the sides of the windrow. The disclosed system prevents uneven drying and presents new efficiencies.

10 Claims, 23 Drawing Sheets

(56) References Cited

U.S. PATENT DOCUMENTS

| | | | | |
|---|---|---|---|---|
| 6,256,905 | B1 * | 7/2001 | White | A23L 3/34095 34/218 |
| 6,715,274 | B2 | 4/2004 | Peeters et al. | |
| 7,089,684 | B2 * | 8/2006 | Genier | A61L 11/00 210/603 |
| 8,109,070 | B1 | 2/2012 | Schmidt et al. | |
| 8,296,968 | B2 * | 10/2012 | Hensley | F26B 21/001 166/60 |
| 2005/0102850 | A1 * | 5/2005 | Hill | F26B 9/063 34/58 |
| 2007/0245936 | A1 * | 10/2007 | Sidhwa | A01C 23/008 111/118 |
| 2015/0144362 | A1 * | 5/2015 | Thompson | E01H 12/00 171/107 |

* cited by examiner

EQUIPMENT AND METHODS TO DRY SUGAR BEET PULP AND OTHER PRODUCTS

BACKGROUND OF THE INVENTION (1) Field of the Invention

The invention generally relates to drying agricultural products offsite from growing fields. More particularly, the invention relates to the use of new equipment and methods for offsite curing by spreading, fluffing, windrow formation, mixing and recollection of agricultural products such as sugar beet pulp.

(2) Description of the Related Art

U.S. Pat. No. 3,178,876 issued on Apr. 20, 1965 to Lunberg discloses improvements to windrow lifters to gently move grains out of field stubble for more efficient drying.

U.S. Pat. No. 3,884,022 issued on May 20, 1975 to Landolt discloses a machine for windrow maintenance for field curing of forage crops such as hay.

U.S. Pat. No. 4,730,447 issued on Mar. 15, 1988 to Fisher et al discloses a windrow turning machine that uses a cumbersome table. The Fisher machine requires material to be lodged upon a moving structure which is supported over the collection components.

U.S. Pat. No. 4,738,092 issued on Apr. 19, 2014 to Jennings discloses a windrow inverter and mover that requires the use of two discharge chutes and other bulky components that are dragged over a field.

U.S. Pat. No. 6,715,274 issued on Apr. 6, 2004 to Peeters et al discloses a transverse conveyer assembly to move and/or fluff a windrow. The Peeters conveyer assembly is unduly complex and requires the management of both vertical and horizontal speeds.

U.S. Pat. No. 8,109,070 issued on Feb. 7, 2012 to Schmidt et al discloses a two transport system for moving a windrow.

The prior art contemplates the creation of windrows upon a crop field so as to avoid transportation costs of moving a crop to a more centralized drying area or system. The prior art requires drying equipment to be available upon all growing fields, requiring extra expense for each farm owner. Also, field drying often leads to leaving a crop in moist soil, exposing the crop to mold, pests and increased drying time. Field drying also requires use of valuable farm land that may otherwise be more quickly used for growing another crop. Thus, there are many shortfalls in the related art.

BRIEF SUMMARY OF THE INVENTION

The present invention overcomes shortfalls in the related art by presenting an unobvious and unique combination, configuration and use of systems and methods for a new centralized off site drying process. The disclosed systems eschew the prior art's use of field curing and provide far more efficient curing systems that place material upon asphalt and use specially designed machines to spread, fluff, windrow, mix, re-windrow, recollect and load.

In general, the disclosed embodiments enable crops or other products to be collected from a growing field and deposited into a new spreader trailer system. The spreader trailer system may comprise two compartments with each compartment comprising a belt or chain drive system moving flat conveyer bars toward one or more rows of breakup tines. The contents of the compartments are directed to external rotation plates. The external rotation plates may comprise a rib structure and disperse material in thin layers of approximately one inch thick. One or more passes may be made over an asphalt surface to deposit one or more layers of material.

An optional fluffer or aeration system may be used to beat, lift or otherwise disturb the deposited layers. The fluffer or aeration system may comprise an aeration assembly comprising a rotation shaft connected to a plurality of mixing flat rods.

An optional windrow construction system or cultivator system may be used to move the material into rows or windrows upon asphalt or other surface. The windrow construction system may comprise a plurality of diversion bars, with each diversion bar comprising a lower lip and/or an upper lip. One or more diversion bars may be attached to a diversion connection bar and each diversion connection bar may be attached to one or more angled attachment bars. The angled attachment bars may be attached to a trailer assembly.

While the material is positioned in rows or windrows, exposed asphalt may radiate heat upon the sides and bottoms of the windrows while sunlight directly cures the exposed material. The use of asphalt or other hard surfaces has produced unexpected and favorable results over the prior art methods in field curing. The disclosed methods and system avoid prior art problems of crusting wherein top layers would dry out while lower layers would remain moist and be in danger of succumbing to mold and rot.

To further ensure even curing, an optional drag bar system deconstructs the windrows and turns the material for more even curing. The disclosed drag bar system may comprise a drag bar assembly which may comprise a horizontal bar, supporting a first angled bar and a second angled bar. A drag bar assembly may comprise an optional cross bar assembly. Each drag bar assembly may be attached to one or more angled attachment bars which in turn may be attached to a trailer assembly. The disclosed drag bar assembly provides advantages over the prior art by wedging into damp material causing the material to flow over the drag bar assembly while at the same time causing the material to press downwardly upon the drag bar assembly.

The cured material may be moved into larger width rows by use of an optional wide row maker system or wide windrow system that may comprise a curved plow blade supported upon an upper support structure by use of a cable and mast system. The wide windrow system places the cured material into wide rows or windrows suitable for efficient collection by a conveyer collection system.

A disclosed conveyer collection system may comprise an auger collection assembly which may comprise an auger, a fanned collection guide and a compact collection guide. The auger may move material upon a conveyer belt to a collection truck. The conveyer collection system may be configured for front loading of the collection truck.

These and other objects and advantages will be made more apparent when considering the following detailed specification when reviewed in conjunction with the drawings.

REFERENCE NUMERALS IN THE DRAWINGS

Figure 1:
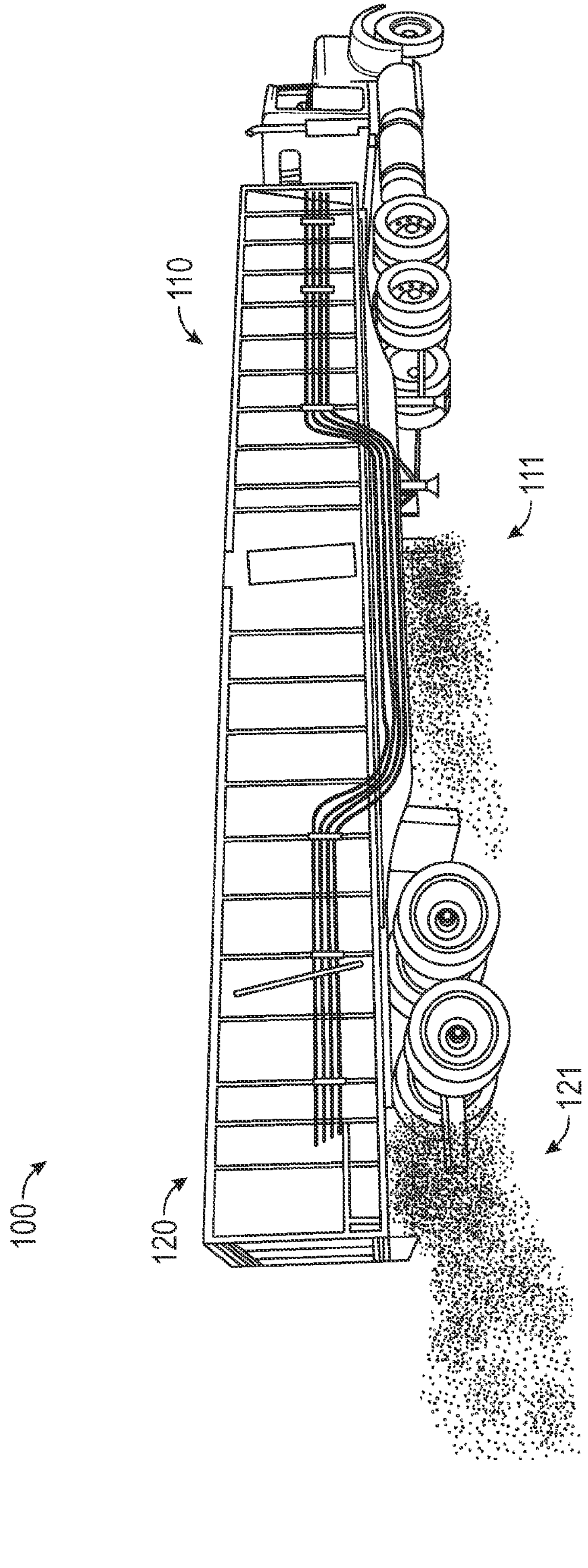
FIG. 1 is a perspective view of distribution system or spreader trailer system

100 a distribution system or spreader trailer
110 a first bed area
111 a first dispersion area
120 a second bed area
121 a second dispersion area
130 a floor surface of a bed area
132 angled back plate on tine side of bed area
133 center void defined by angled back plate 132 and floor surface 130
134 lateral voids defined by angled back plate 132, floor surface 130 and internal side walls 140
135 flat conveyer bars
137 chain or other belt drive system
140 internal side walls of spreader trailer
150 first horizontal rotational bar
152 plurality of breakup tines attached to the first horizontal rotational bar 150
155 a second horizontal rotational bar
157 plurality of breakup tines attached to the second horizontal rotational bar 155
160 rotational plate
163 rotational motor or drive system
165 ribs upon a rotational plate
170 a diversion shield fastened behind a rotational plate 160
172 curved center shield
173 rear center shield
200 windrow construction system or cultivator system
210 diversion bar
212 lower lip of diversion bar
214 upper lip of diversion bar
216 diversion bar body
220 diversion connector bar
230 angled attachment bar
235 cross bar
240 trailer assembly for cultivator system
300 fluffer or aeration system
310 lower cross bar assembly
312 flat ground bar
314 pivot blocks of lower cross bar assembly
315 motor rotating rotation shaft 322
320 aeration assembly
322 rotation shaft
324 mixing flat rods
330 attachment bar
400 drag bar system
410 drag bar assembly
411 front or leading edge of horizontal bar 412
412 horizontal bar
413 trailing edge or rear edge of horizontal bar 412
414 first angled bar
416 second angled bar
417 trail edge or back edge of second angled bar 416
430 angled attachment bar for drag bar assembly
440 trailer assembly
450 optional cross bar assembly
500 wide row maker system
510 curved plow blade
520 upper support structure
540 mast for support cable
550 cable for support system
600 conveyer collector system
610 auger collection assembly
612 auger
620 fanned collection guide
625 compact collection guide
627 offset frame of collector system
630 conveyer belt
640 collection truck
650 extended side walls of collection truck
700 food product, agricultural product or any biological matter that may include sugar beet pulp These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words “comprise,” “comprising” and the like are to be construed in an inclusive sense as opposed to an exclusive or exhaustive sense; that is to say, in a sense of “including, but not limited to.” Words using the singular or plural number also include the plural or singular number, respectively. Additionally, the words “herein,” “above,” “below,” and words of similar import, when used in this application, shall refer to this application as a whole and not to any particular portions of this application.

All the above references and U.S. patents and applications are incorporated herein by reference. Aspects of the invention can be modified, if necessary, to employ the systems, functions and concepts of the various patents and applications described above to provide yet further embodiments of the invention.

Referring to FIG. 1 a spreader trailer 100 may comprise a first bed area 110 and a second bed area 120 and a first dispersion area 111 and a second dispersion area 121. A spreader trailer or dispersion system may deposit layers of material upon an asphalt surface or other hard surface. The layers may be approximately one inch in depth. The use of layers overcomes shortfalls in the related art of field curing as curing in a crop field does not allow for layering of material. The disclosed spreader trailer and/or dispersion system allows for some measure of drying or curing between layers.

Figure 2:
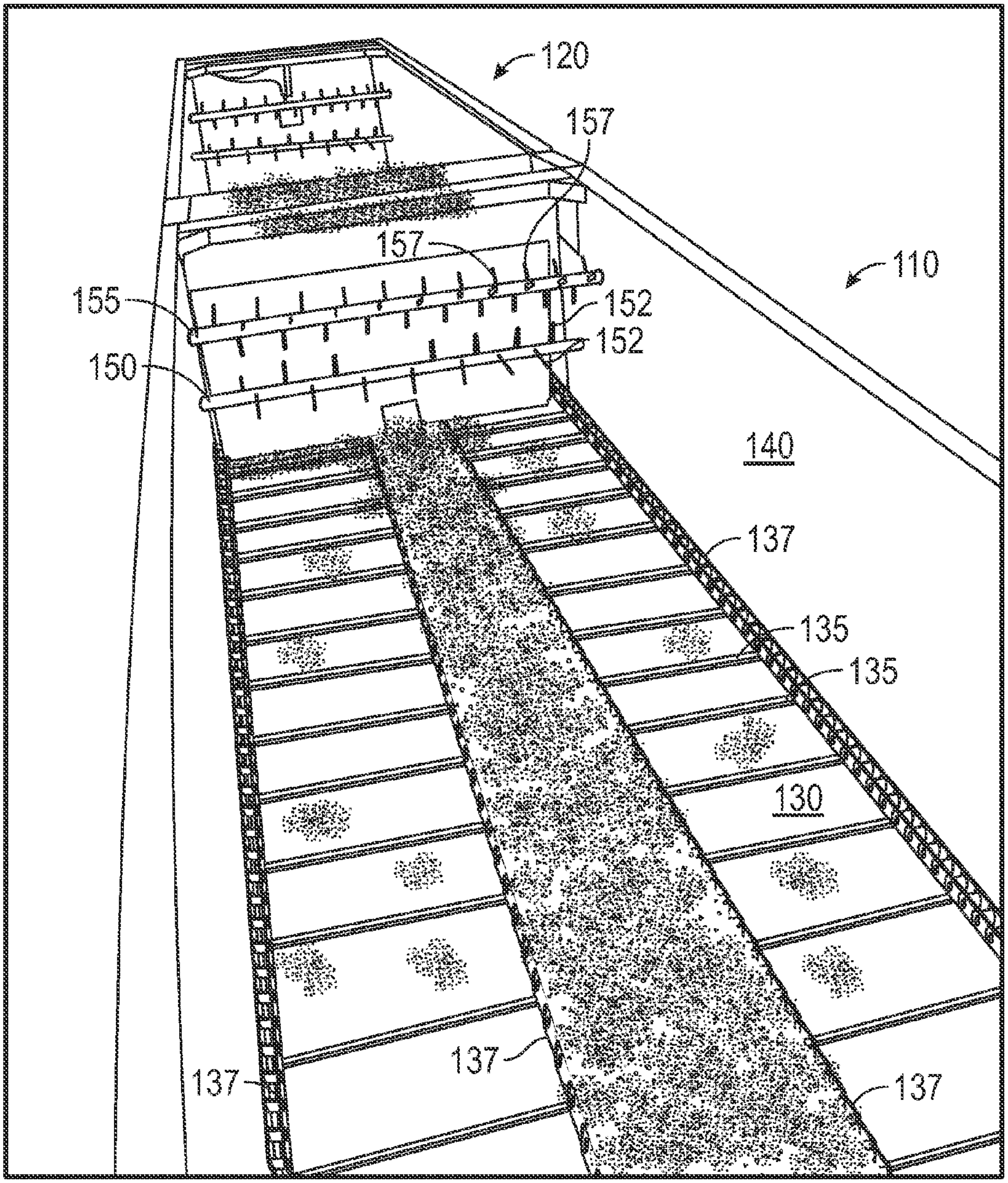
FIG. 2 is a perspective view of conveyer and breakup system internal to a distribution system or spreader trailer system
Figure 3:
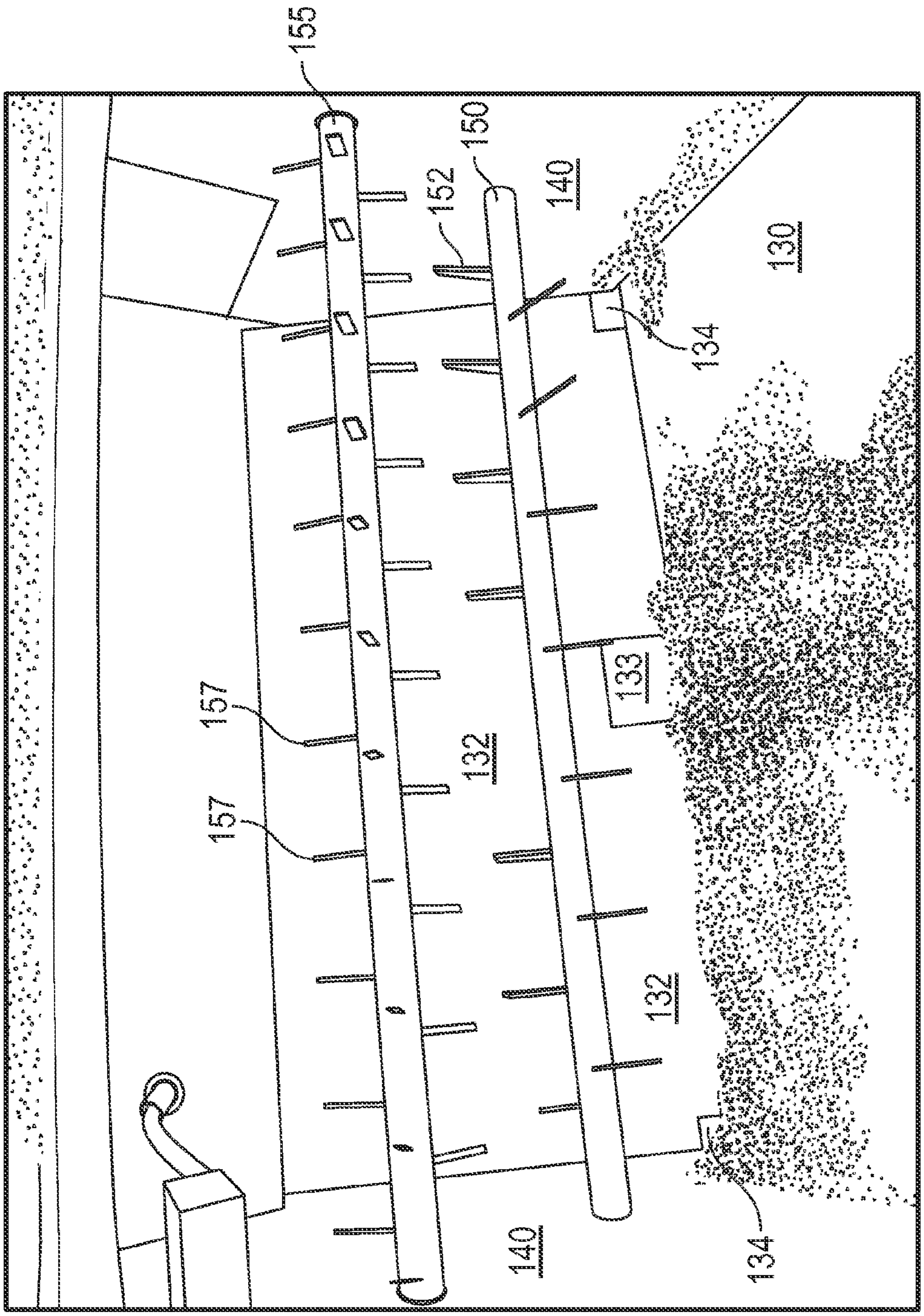
FIG. 3 is a perspective view of a breakup system internal to a spreader trailer system

FIG. 2 depicts a first bed area 110 in the foreground and a second bed area 120 in the background. A spreader trailer may have one or more bed areas. Referring to the first bed area 110, a dispersion or spreading system may comprise a walk in trailer having sidewalls 140 and a conveyer system with the conveyer system moving along a bed or floor surface 130 and the conveyer system comprising a plurality of flat conveyer bars attached to chains 137 or other systems of movement. The conveyer bars 135 may move material toward a plurality of breakup tines. The breakup tines may comprise a first set 152 to tines radially attached to a first horizontal rotational bar 150. An optional second horizontal rotational bar 155 may be radially attached to a second set of breakup tines 157. In the preferred embodiment, four chains 137 move two sets of flat conveyer bars. This disclosed configuration overcomes shortfalls in the related art by moving material without the need for a traditional conveyer system that would cover the entire floor surface 130. The disclosed system of material movement prevents jamming or clogging that would likely occur in a traditional escalator type conveyer system.

The use of breakup tines overcomes shortfalls in the art as the breakup tines break up material to allow the material to fall though voids found near the tines. Without the breakup tines, there is a danger of material overflowing over the sides of the open bed area. The breakup tines also overcome shortfalls in the art by increasing the viscosity of the material such that the external rotational plates may spread the material in a thin layer. The use of a first horizontal rotational bar 150 and a second horizontal rotational bar 155 further assists in preventing material from overflowing and assists in breaking up material for even spreading.

The tine side of the bed area, shown in FIG. 2 may further comprise an angled back plate 132, having a bottom side tilted toward the opposite side of the compartment. The angled back plate overcomes shortfalls in the art by redirecting the material toward the breakup tines. The tine side of the bed area may further comprise two lateral voids 134 defined by the angled back plate 132, floor surface 130 and internal side walls 140. The tine side of the bed area may further comprise a center void 133 defined by or within the angled back plate 132 and floor surface 130. The lateral voids 134 and center void 133 overcome shortfalls in the art by providing efficient return voids for the chains 137.

Figure 4:
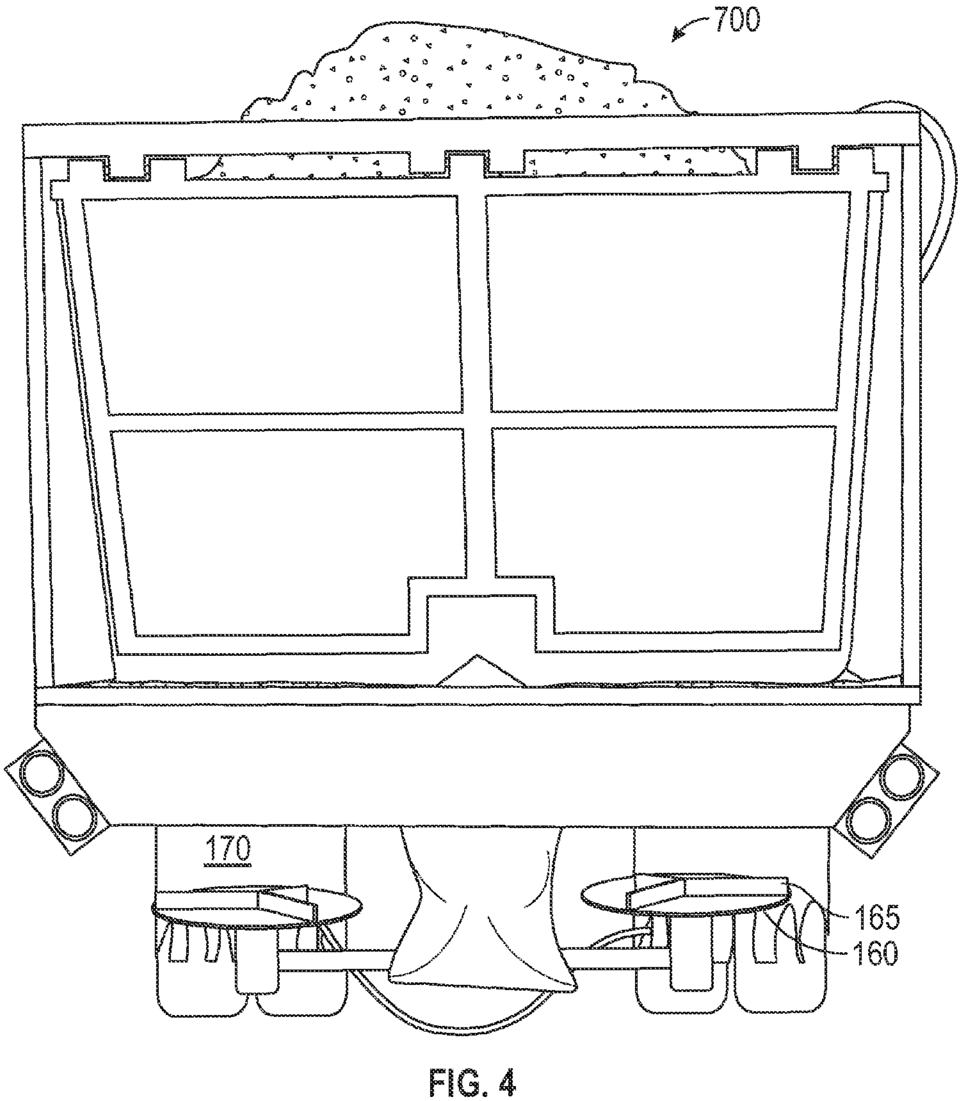
FIG. 4 is a rear elevation view of a spreader trailer

FIG. 4 presents an elevation view of the rear section or tine end of a second bed area. For most purposes, the first and second bed areas are similar and have similar rotational plates 160. During the spreading or distribution process, the rear section or tine section of each bed area will deposit material upon one or more rotational plates 160. The rotational plates may spin during use and may comprise a plurality of radially disposed ribs. The use of radially disposed ribs upon a rotation plate overcomes shortfalls in the art by increasing the distance material is thrown from the rotational plates. Without the ribs 165, material may slide off of the rotational plates prior to being discharged from the centrifugal force generated by the spin of the rotational plates. In order to prevent unduly large amounts of material from staying near the trailer, each rotational plate may be disposed next to a diversion shield 170. The diversion shield 170 deflects material outwardly to achieve a thinner spread of material. A thinner spread of material is conducive to faster curing and avoiding the crusting problems found in the prior art of field curing.

Figure 5:
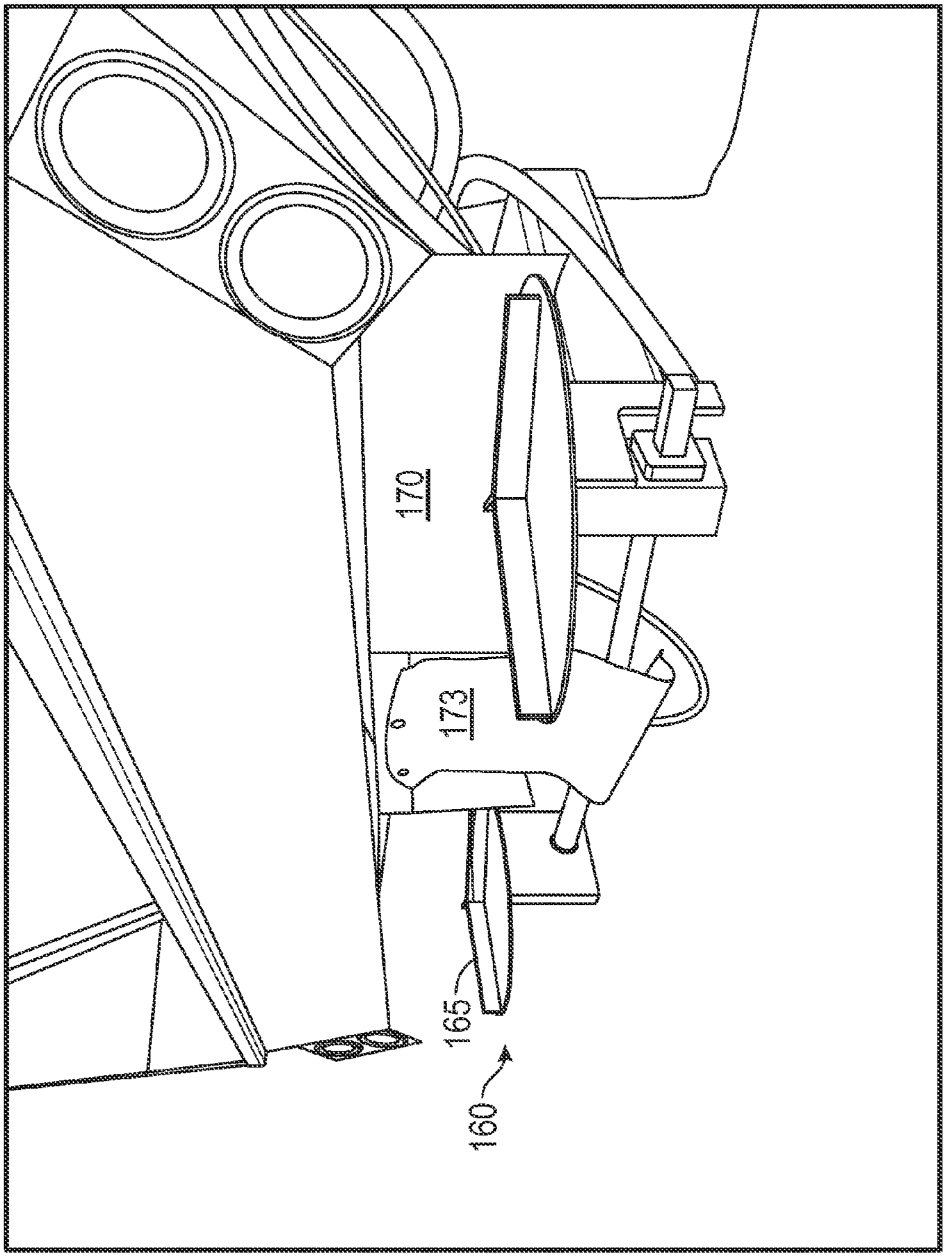
FIG. 5 is a perspective view of rotational ribbed discharge plates external to a spreader trailer

FIG. 5 presents a perspective view of two rotational plates. A diversion shield 170 may be curved to further disperse material away from the trailer. A diversion shield may be outwardly or laterally orientated so as to direct material away from the trailer. A rear center shield 173 may be disposed between two rotational plates so as to further direct or deflect material away from the trailer.

Figure 6:
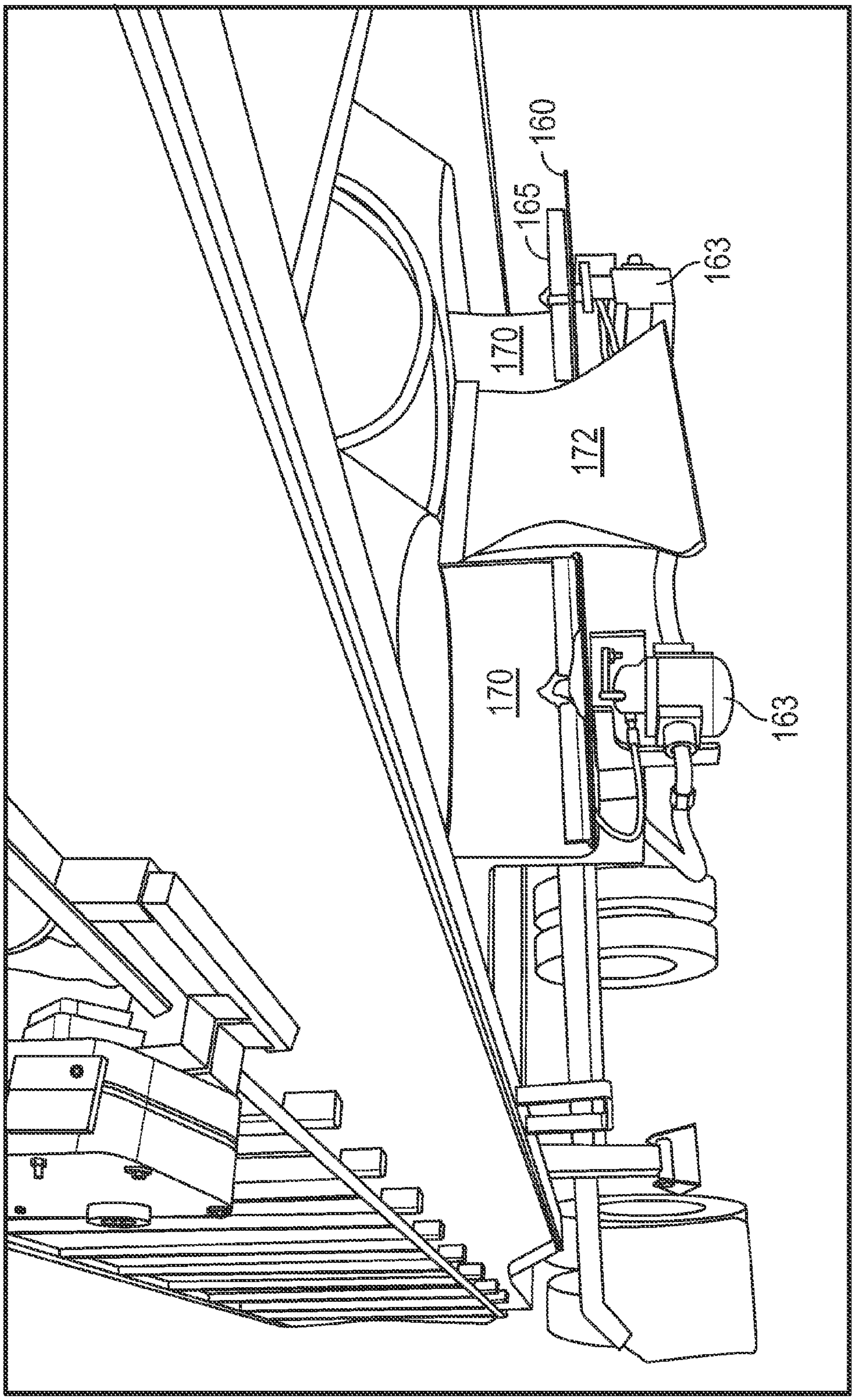
FIG. 6 is a perspective view of rotational plates external to spreader trailer

FIG. 6 depicts a perspective view of a two rotational plates 160 located below a first bed area. The rotational plates are shown to be superior to a rotational motor 163 or drive system used to spin the rotational plates. A curved center shield 172 may be disposed between the rotational plates in order to direct or deflect material away from the trailer.

Figure 7:
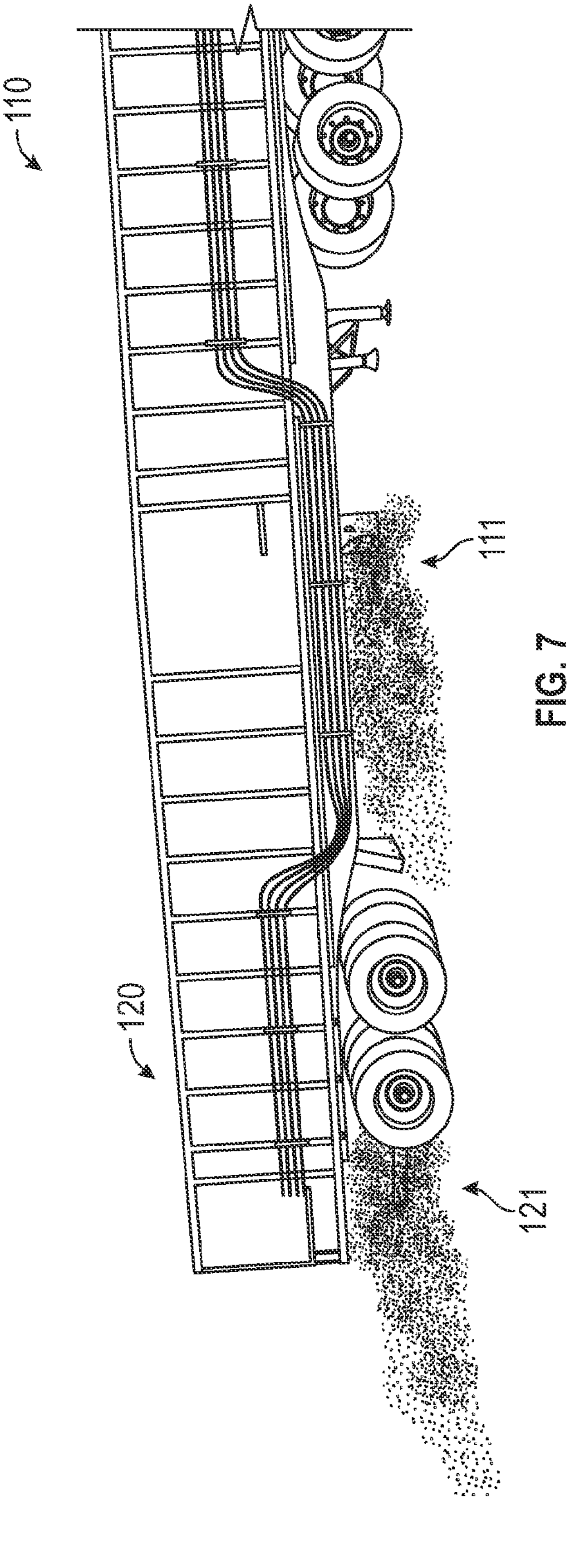
FIG. 7 is a perspective view of material distributed upon an asphalt or other surface

FIG. 7 depicts a spreader trailer having a first bed area 110 and a second bed area 120 with material being discharged from a first dispersion area 111 and a second dispersion area 121. The first dispersion area 111 is below or near the breakup tines in the first bed area 110. The second dispersion area 121 is below or near the breakup tines in the second bed area 120. Each dispersion area is further defined by the placement and use of rotational plates.

Figure 8:
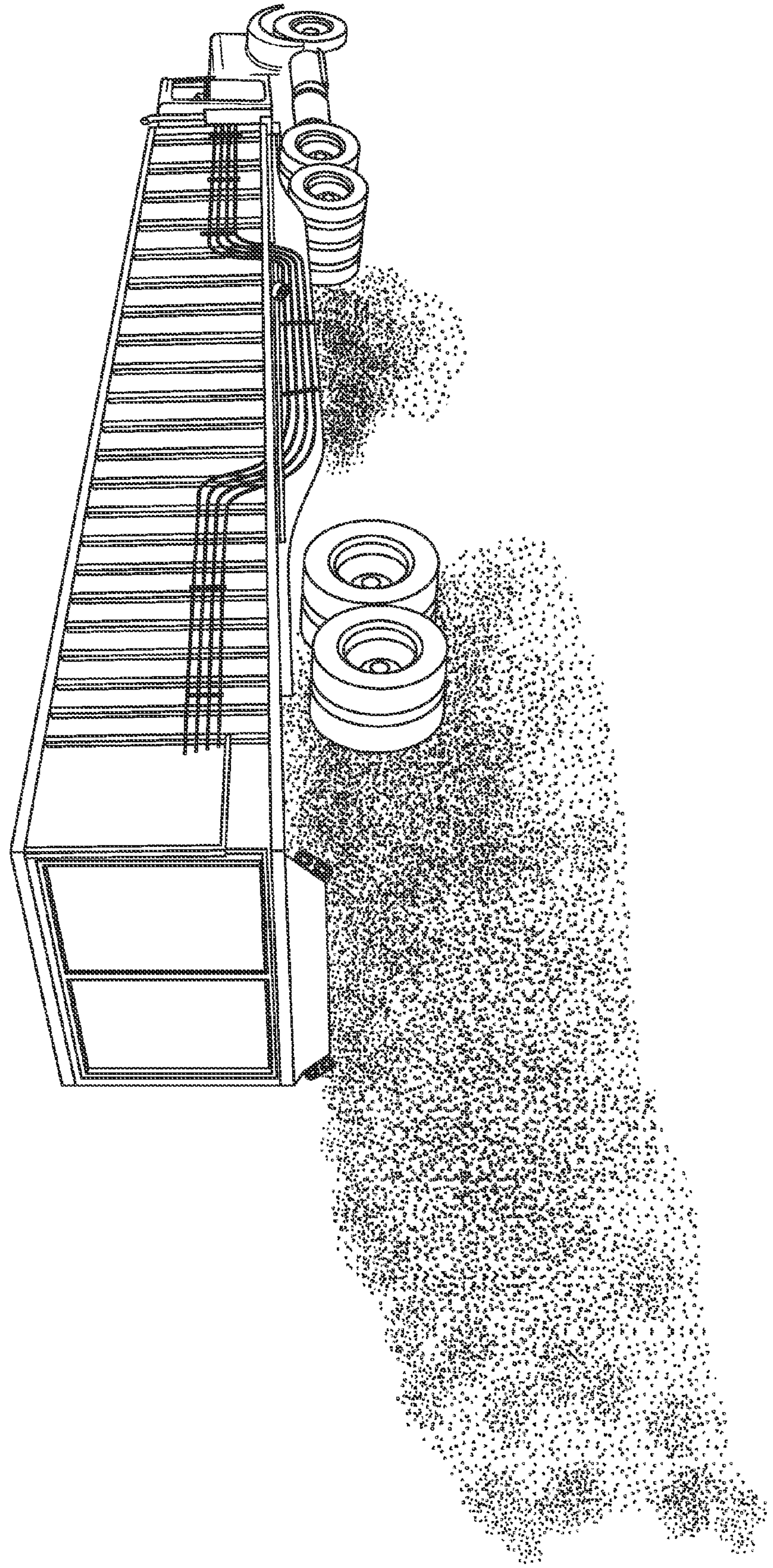
FIG. 8 is a perspective view of material distributed upon an asphalt or other surface

FIG. 8 depicts a side and rear perspective view of material flowing out of a spreader trailer.

Figure 9:
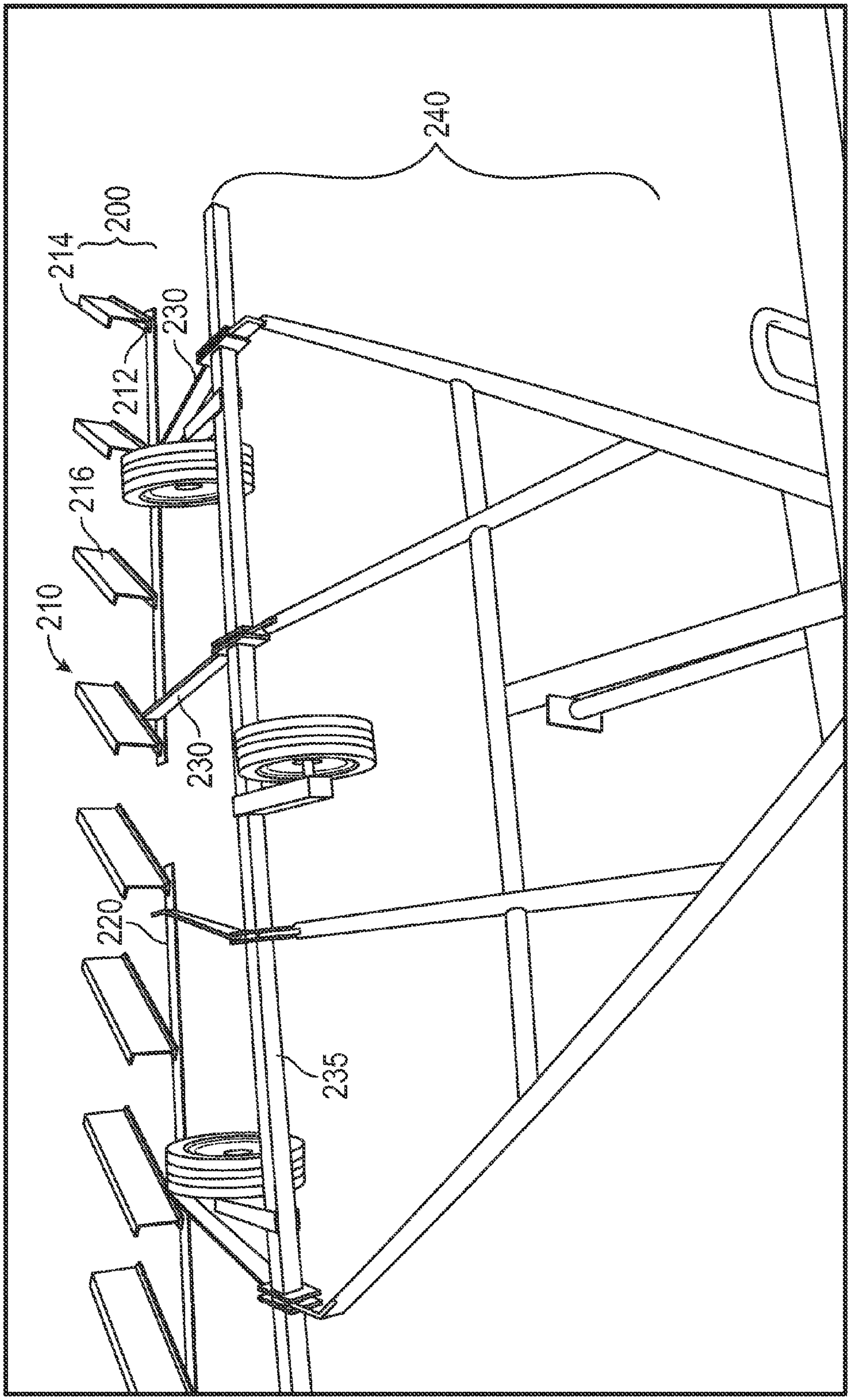
FIG. 9 is a perspective view of a cultivation system or windrow formation system

FIG. 9 depicts a perspective view of a windrow construction system or cultivator system that may comprise a plurality of diversion bars 210. A diversion bar may comprise a lower lip 212 and/or an upper lip 214. The lower lip 212 provides an advantage of preventing or reducing the amount of material slipping under a diversion bar. The upper lip 212 provides an advantage of preventing or reducing the amount of material flowing over a diversion bar.

A diversion bar 120 may be connected to a diversion connector bar 220 at an angle so as to facilitate the construction or cultivation of windrows. One or more angled attachment bars 230 may connect a diversion connector bar to a cross bar 235. The cross bar 235 may be part of a trailer assembly 240.

Figure 10:
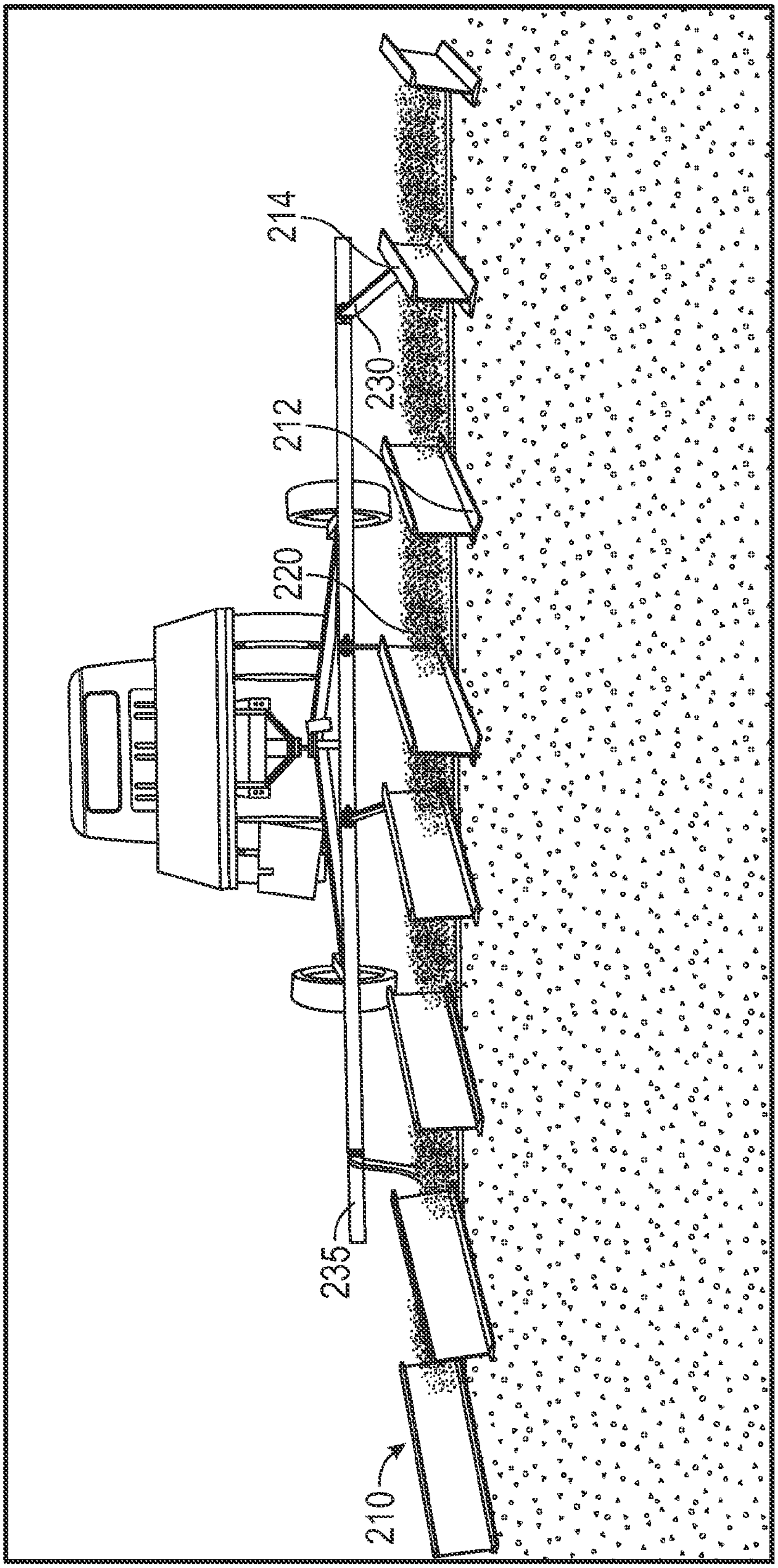
FIG. 10 is a perspective view of a windrow formation system used upon asphalt or other hard surface

FIG. 10 depicts a windrow construction system or windrow cultivator system being pulled by a tractor.

Figure 11:
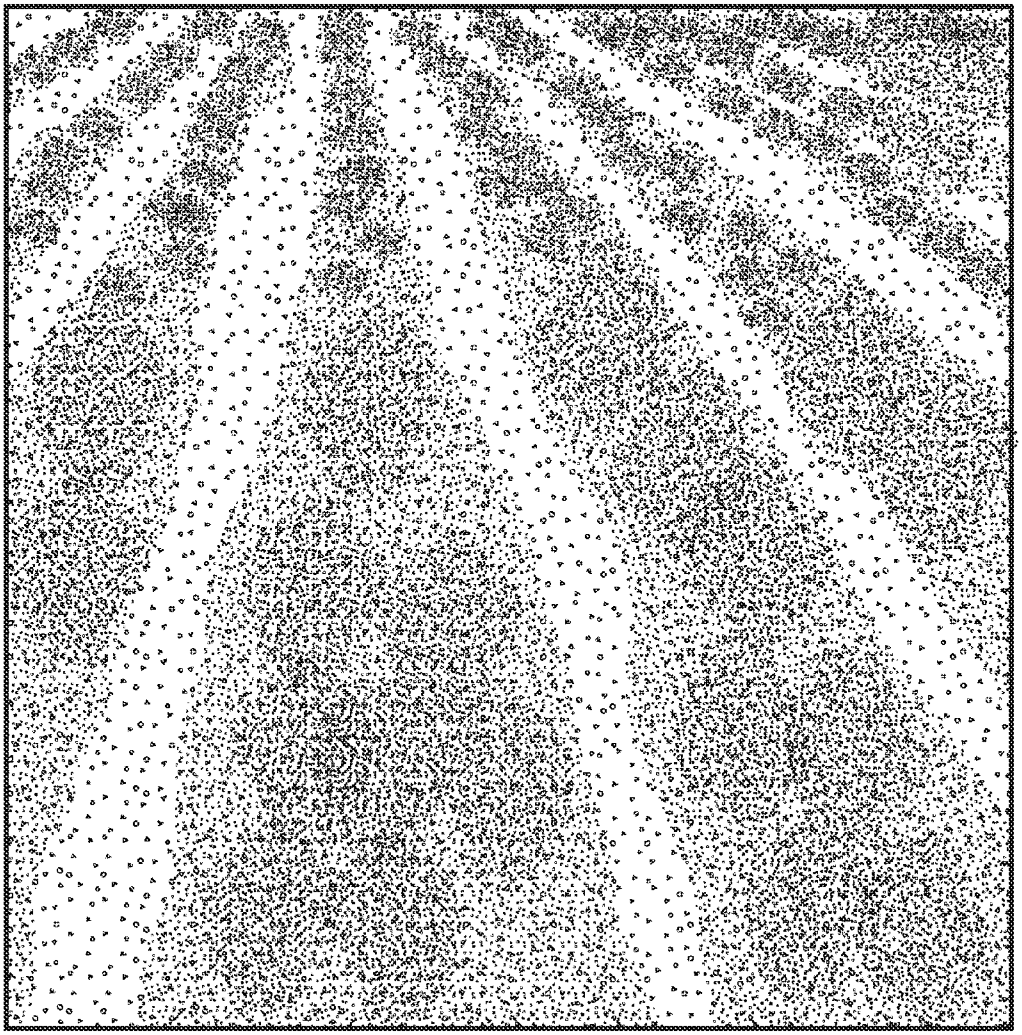
FIG. 11 is a perspective view of formed windrows or rows of material to be cured
Figure 12:
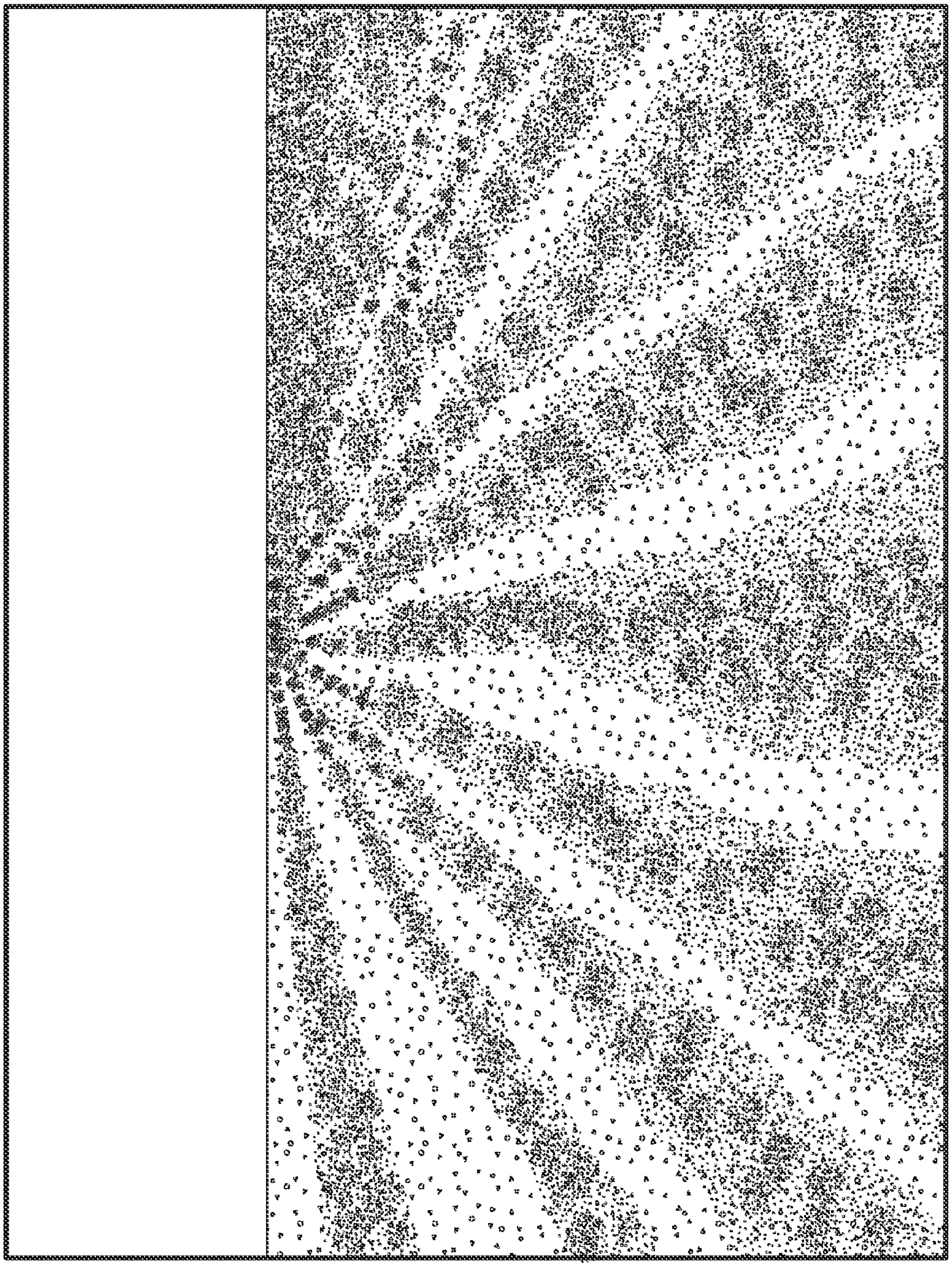
FIG. 12 is a perspective view of formed windrows rows of material to be cured

FIG. 11 and FIG. 12 roughly depict windrows of material placed upon asphalt or another hard surface.

Figure 13:
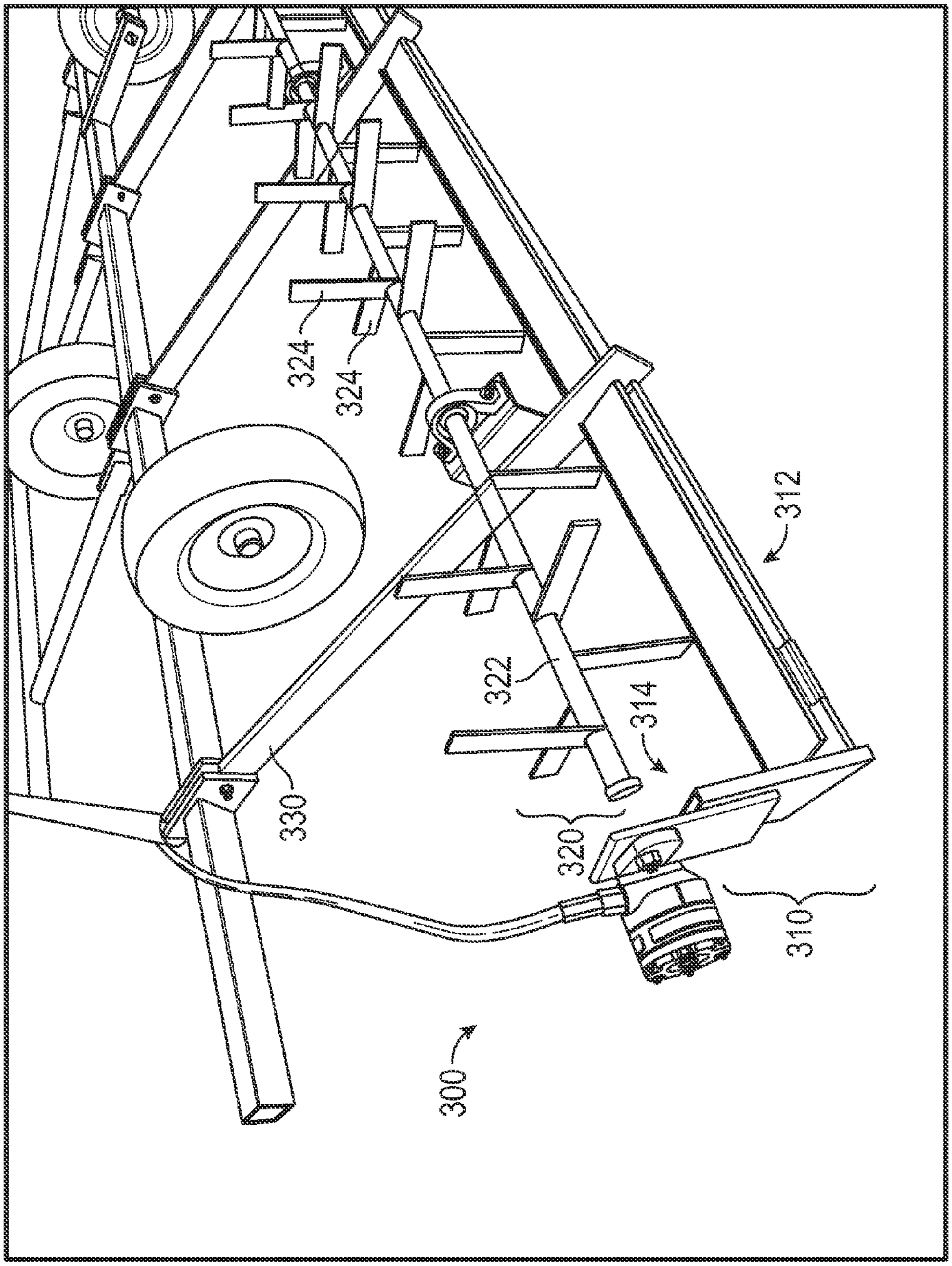
FIG. 13 is a perspective view of a fluffer, mixer or aeration system

FIG. 13 depicts a fluffer or aeration system 300 which may comprise a plurality of attachment bars 330 attached to a flat ground bar 312. The flat ground bar 312 may be attached to a lower cross bar assembly 310 which may comprise an aeration or fluffer assembly 320. A fluffer assembly may comprise a rotation shaft 322 with a plurality of mixing flat rods 324 radially attached. The mixing flat rods are aligned such that their narrow section rotates around the rotation shaft. This alignment provides an advantage of cutting though the material but yet lifting the material into the air for further disbursement and mixing. The mixing flat rods are attached at right angles from one another, providing an advantage of preventing or reducing material sticking to the mixing flat rods.

Figure 14:
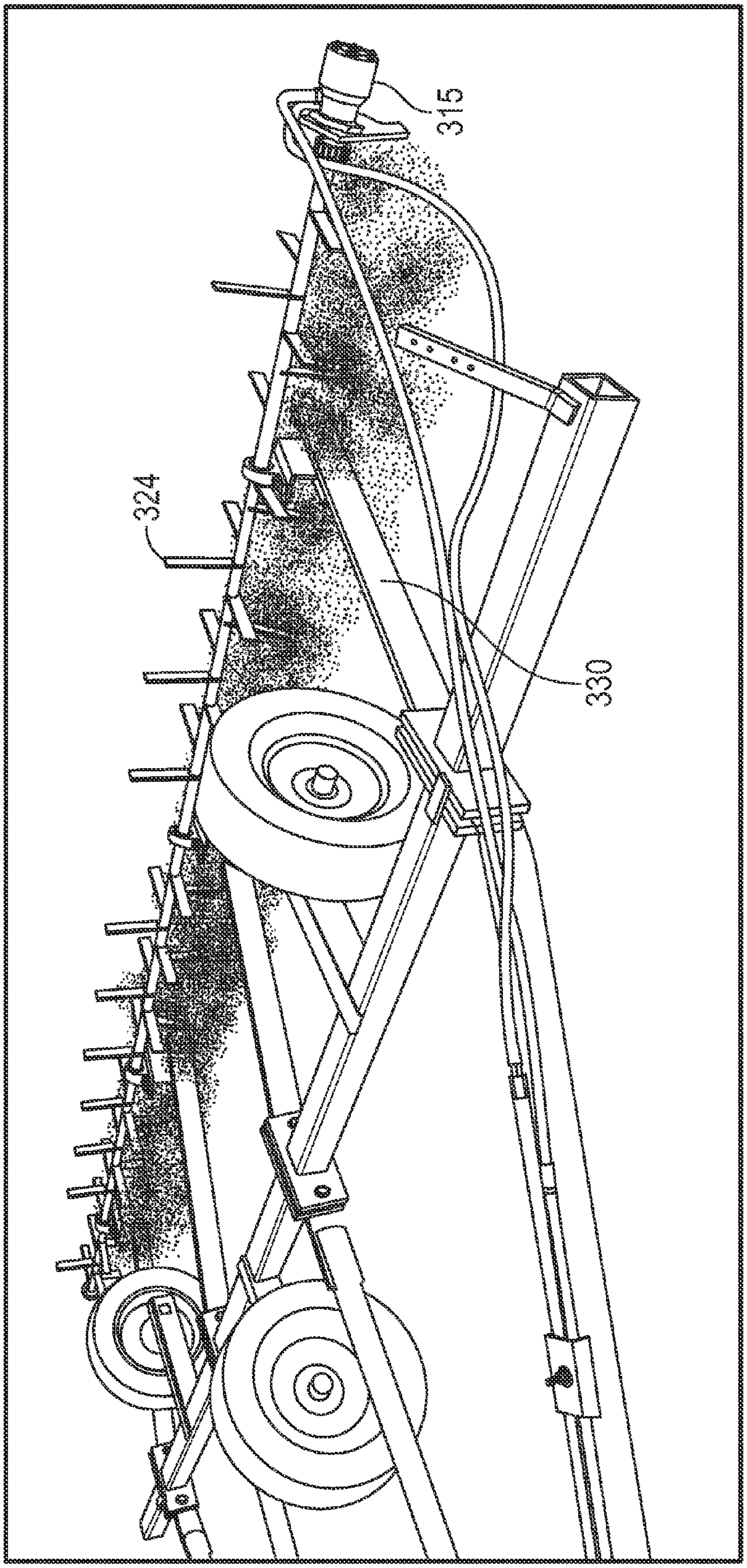
FIG. 14 is a perspective view of a fluffer, mixer or aeration system used upon asphalt or other hard surface

FIG. 14 depicts an aeration system in use. A motor 315 or other system causes the rotation shaft to spin.

Figure 15:
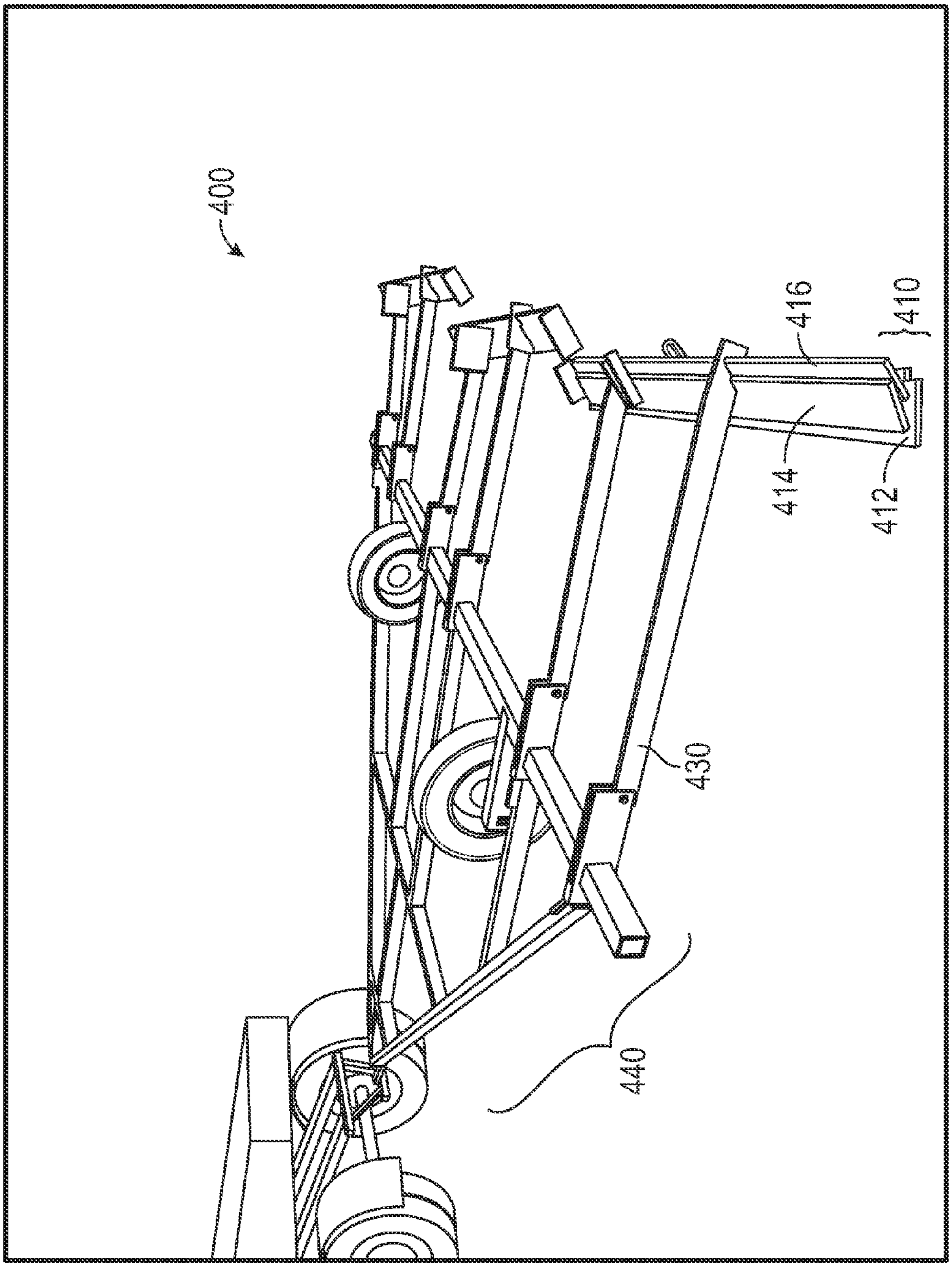
FIG. 15 is a perspective view of a drag system

FIG. 15 depicts a dragger system 400 which may comprise a drag bar assembly 410 with the drag bar assembly comprising a horizontal bar 412 supporting a first angled bar 414 and a second angled bar 416. The drag bar assembly may be configured to expose the front or leading edge of the horizontal bar 412 as the front or leading edge of the first angled bar 414 is disposed away from the leading edge of the horizontal bar. The rear or trailing edge 417 of the second angled bar 416 extends past the trail edge 413 of the horizontal bar. This configuration provides an advantage of lifting relatively damp or wet material from the asphalt as the weight of the material presses down upon the first and second angled bars, which in turn presses down upon the horizontal bar. The forward or leading edge angle of the first and second angled bars causes material to rise into the air over the drag bar assembly 410 while keeping the drag bar assembly from lifting or skipping over the material.

FIG. 15 further depicts the plurality of angled attachment bars connected to a trailer assembly 440 with the trailer assembly being pulled by a tractor.

Figure 16:
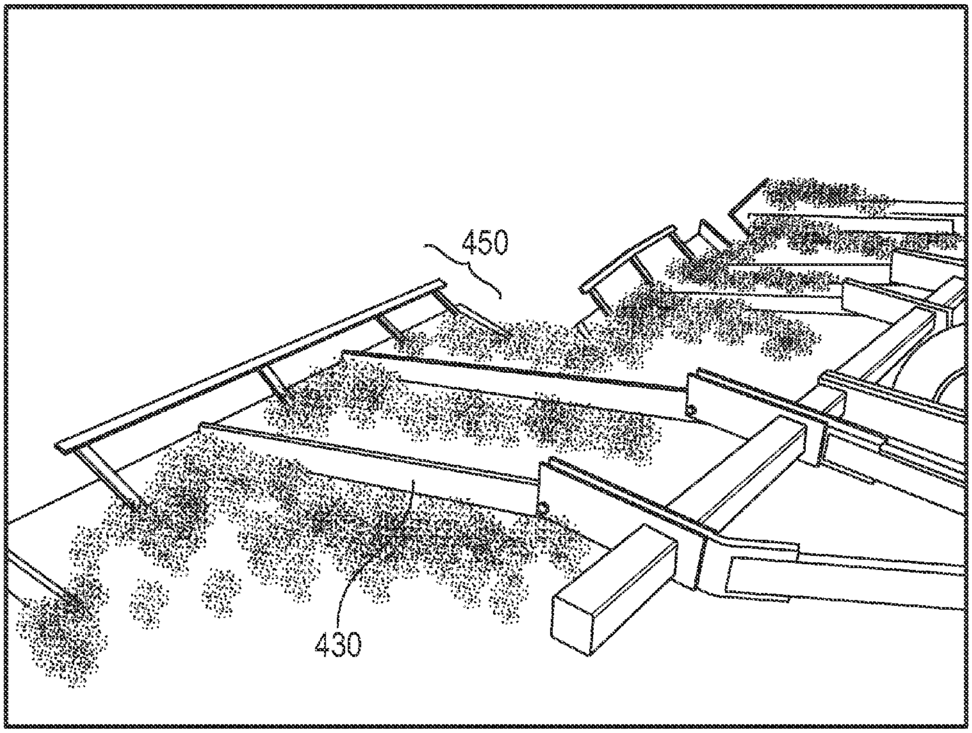
FIG. 16 is a perspective view of a drag system with optional cross bars

FIG. 16 depicts a drag bar assembly further comprising an optional cross bar assembly.

Figure 17:
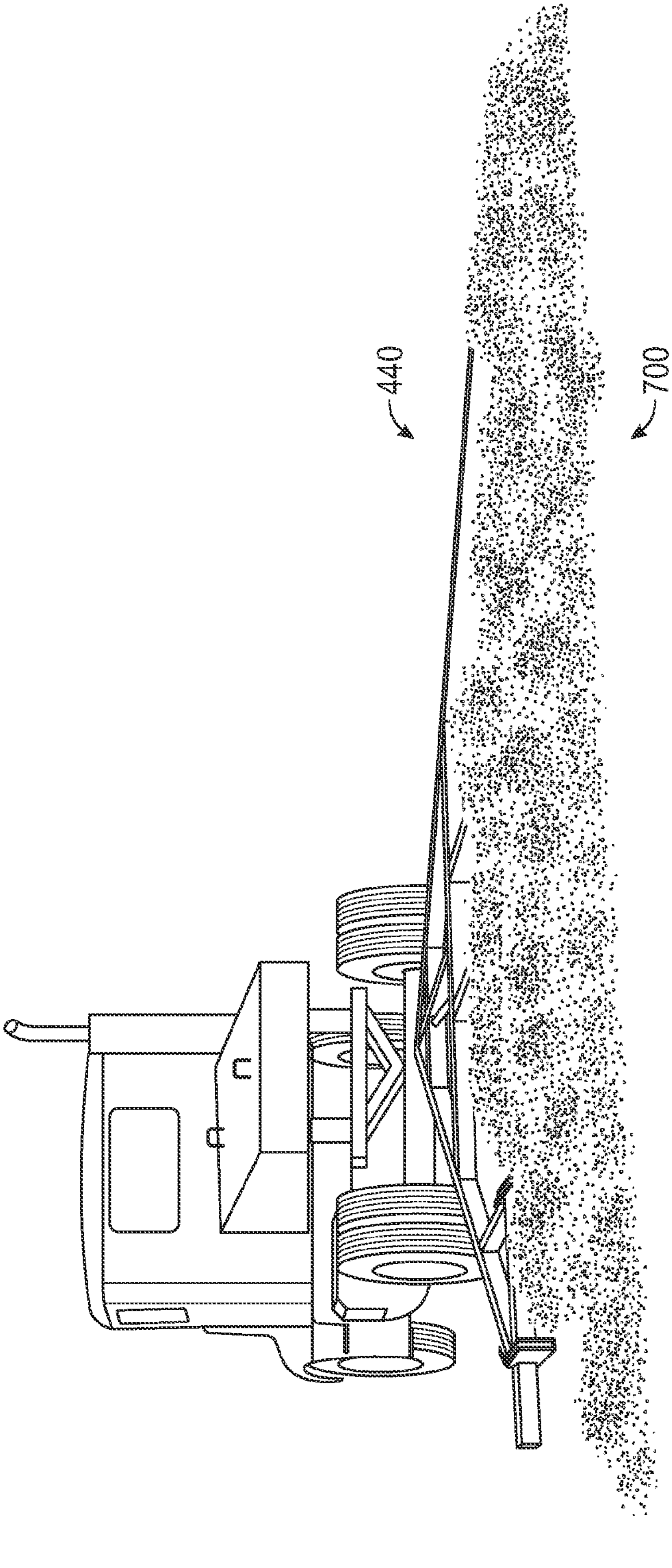
FIG. 17 is a perspective view of a drag system in operation

FIG. 17 depicts material 700 flowing over a drag bar assembly.

Figure 18:
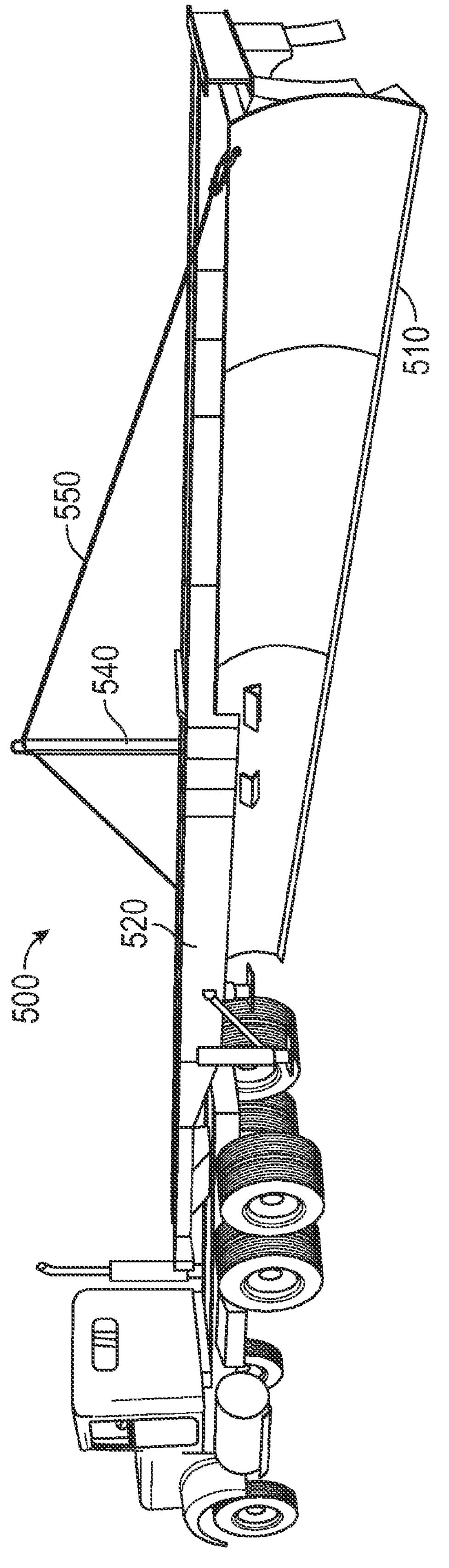
FIG. 18 is a perspective view of a scraper system or wide row maker system
Figure 19:
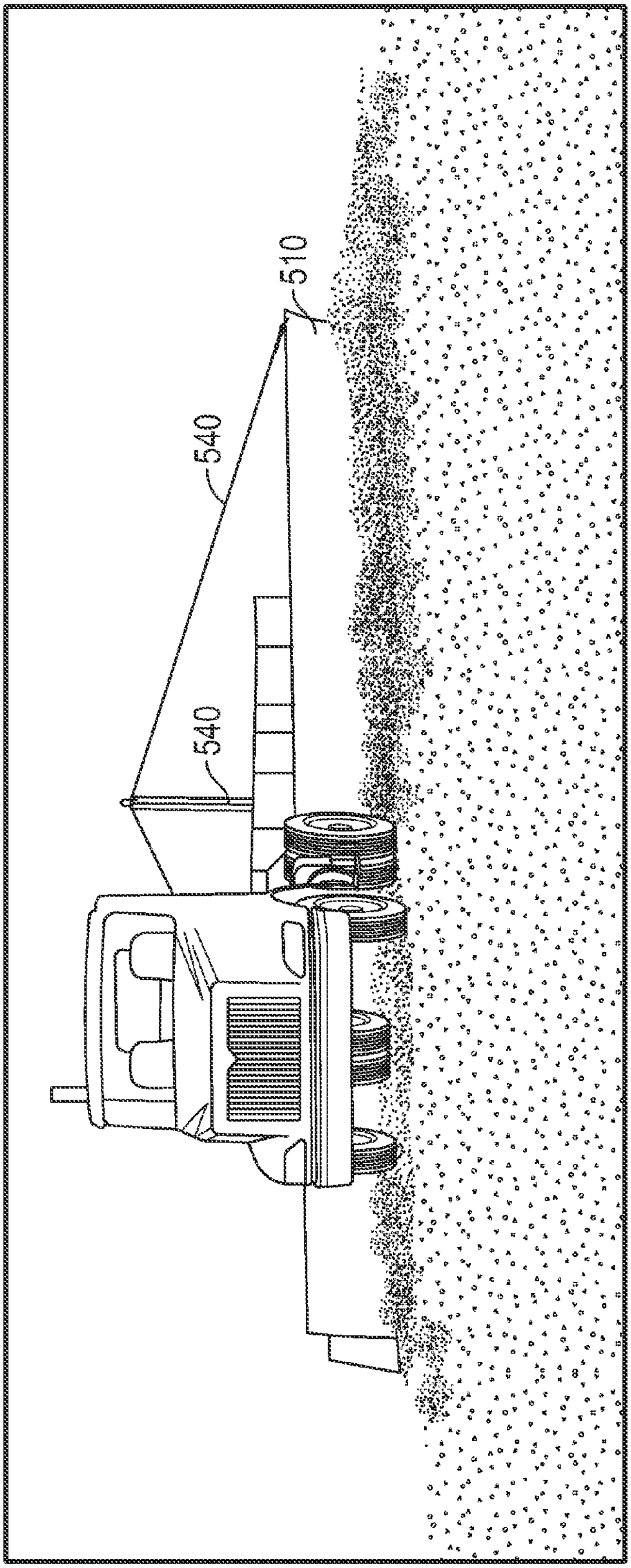
FIG. 19 is a perspective view of a scraper system forming large rows for collection

FIG. 18 depicts a wide row maker system 500 which may comprise a curved plow blade 510 attached to and supported by a upper support structure 520, the upper support structure may take the form of a sliced shipping container. The curved plow blade 510 may be further supported by a mast 540 supporting a cable 550 with the cable attached to either end of the curved plow blade. The mast 540 may be attached to the upper support structure 520 and the upper support structure may be attached to a tractor. The configuration of the row maker system provides an advantage of having a relatively long curved plow blade so as to create relatively wide rows of material for collection. The use of the mast and cable system provides an advantage of allowing for the curved plow blade to be disposed at a greater angle, which in turn creates larger rows of material to facilitate a more efficient collection by the conveyer collector system as described herein.

Figure 20:
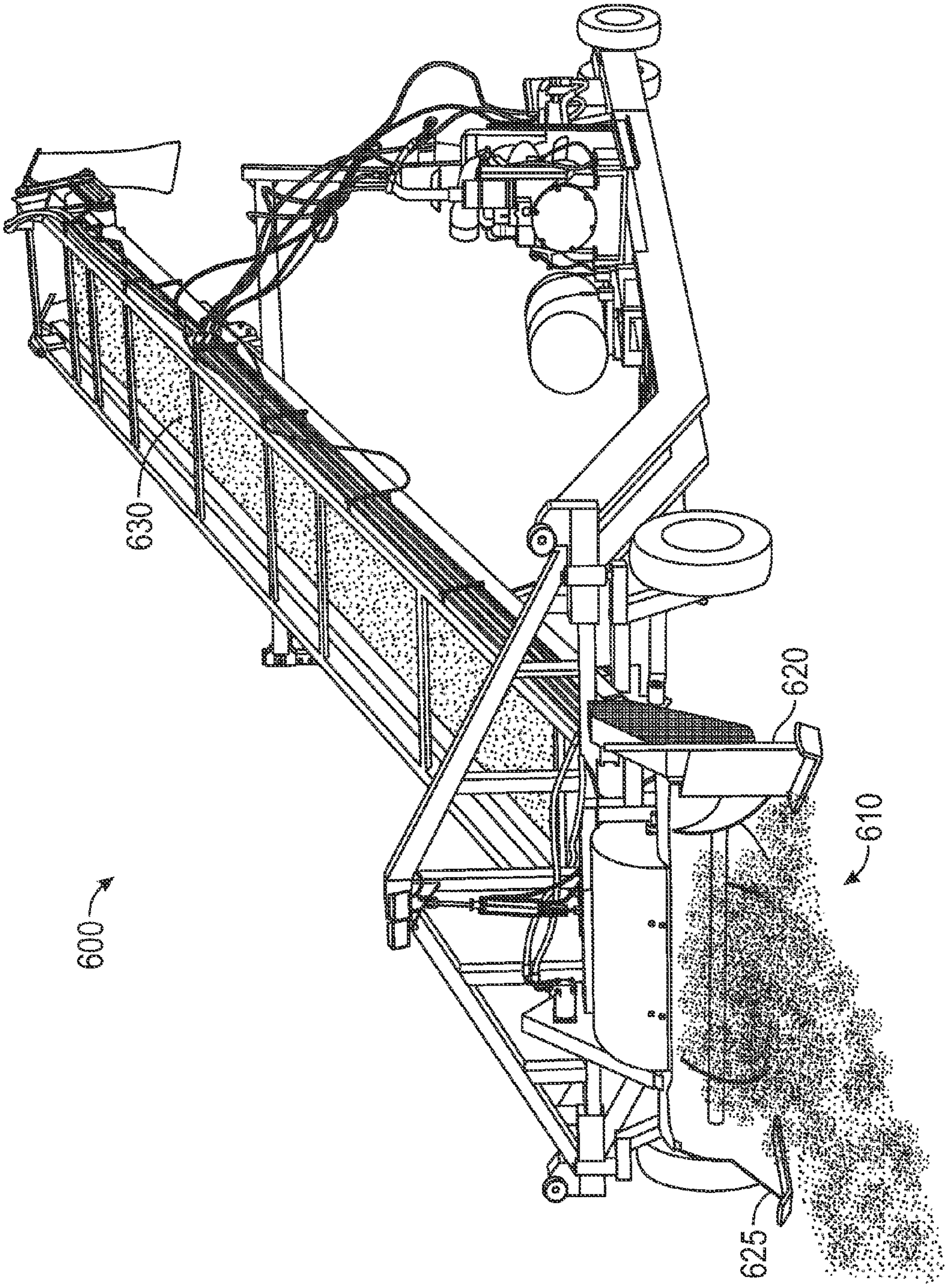
FIG. 20 is a perspective view of a collector system

FIG. 20 depicts a collector system or conveyer collector system 600 which may comprise an auger collection assembly 610 disposed between two collection guides. The collection guides may comprise a fanned collection guide 620 and a compact collection guide 625. The auger collection assembly may be attached to an offset frame 627. The offset frame and overall configuration of the conveyer collector system provides an advantage in comporting to a front loading system wherein a tractor pushes the system into wide rows of material. Thus, collection to dried material occurs without pushing the material or otherwise disturbing the material prior to collection. Wide rows of material are moved from the asphalt onto a conveyer belt 630.

Figure 21:
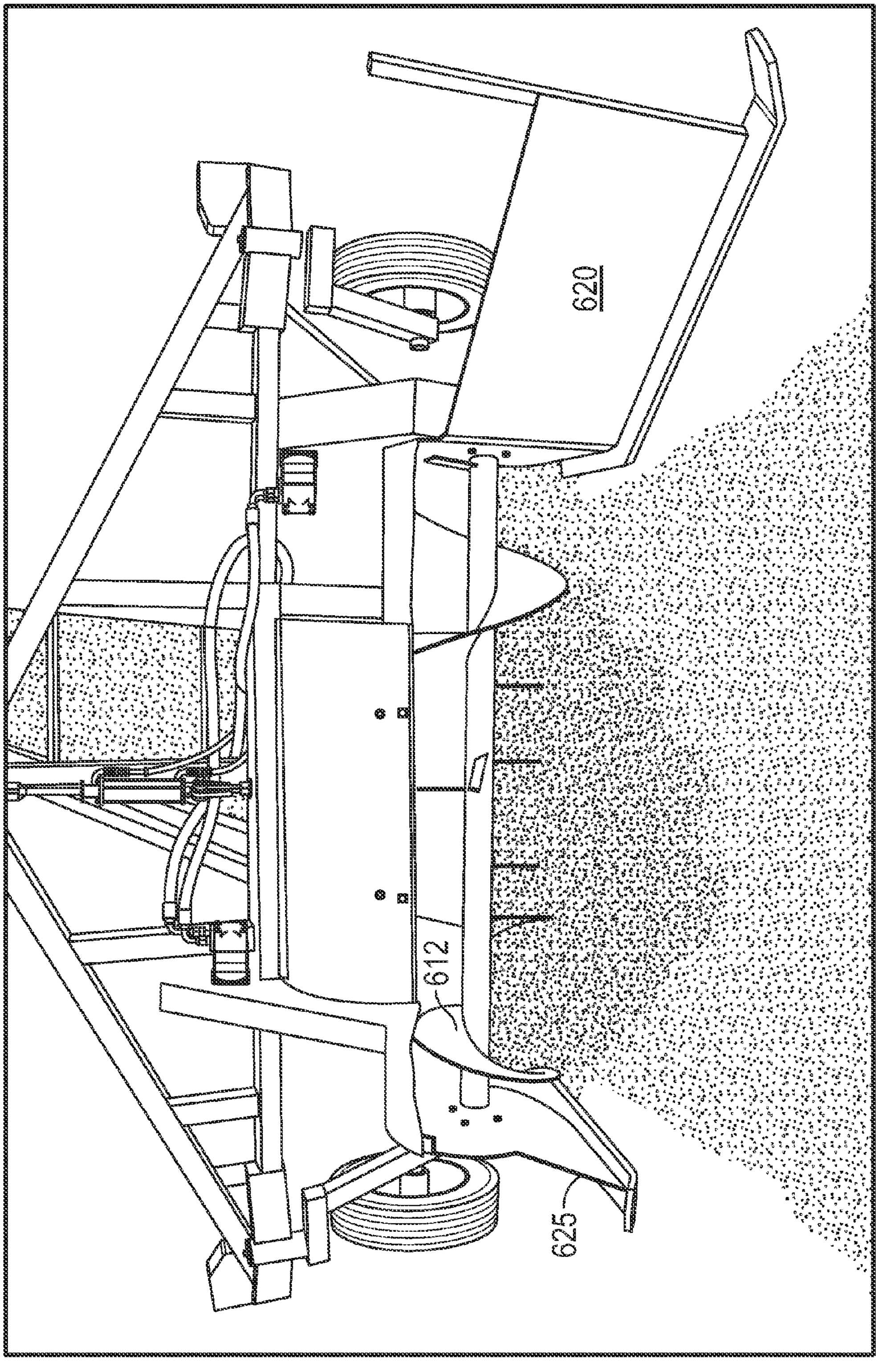
FIG. 21 is a perspective view of a collector

FIG. 21 depicts an auger 612 or collection auger flanked by a fanned collection guide 620 and a compact collection guide 625.

Figure 22:
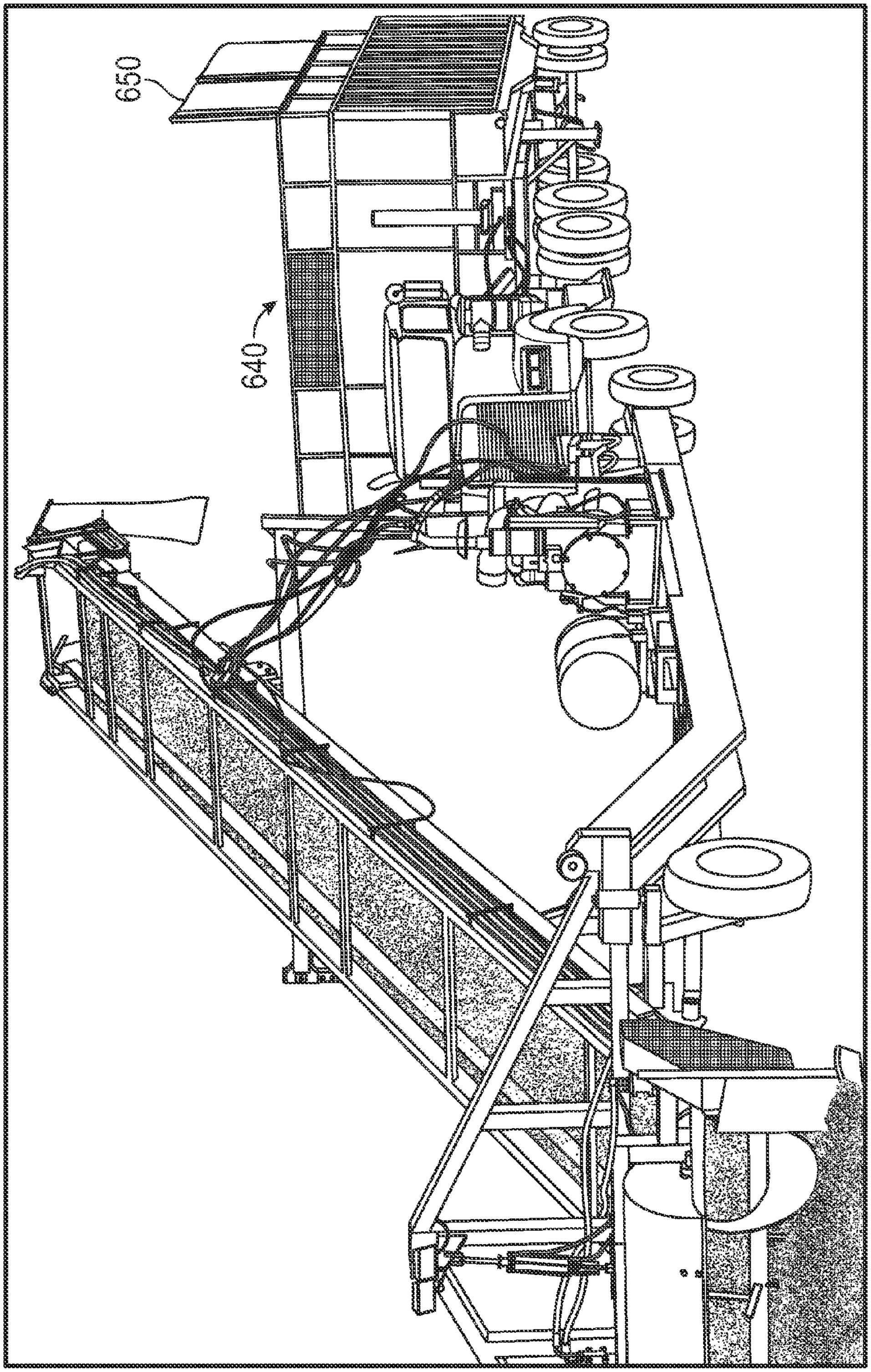
FIG. 22 is a perspective view of a collector system with a collection truck

FIG. 22 depicts a collection truck 640 approaching a collector system.

Figure 23:
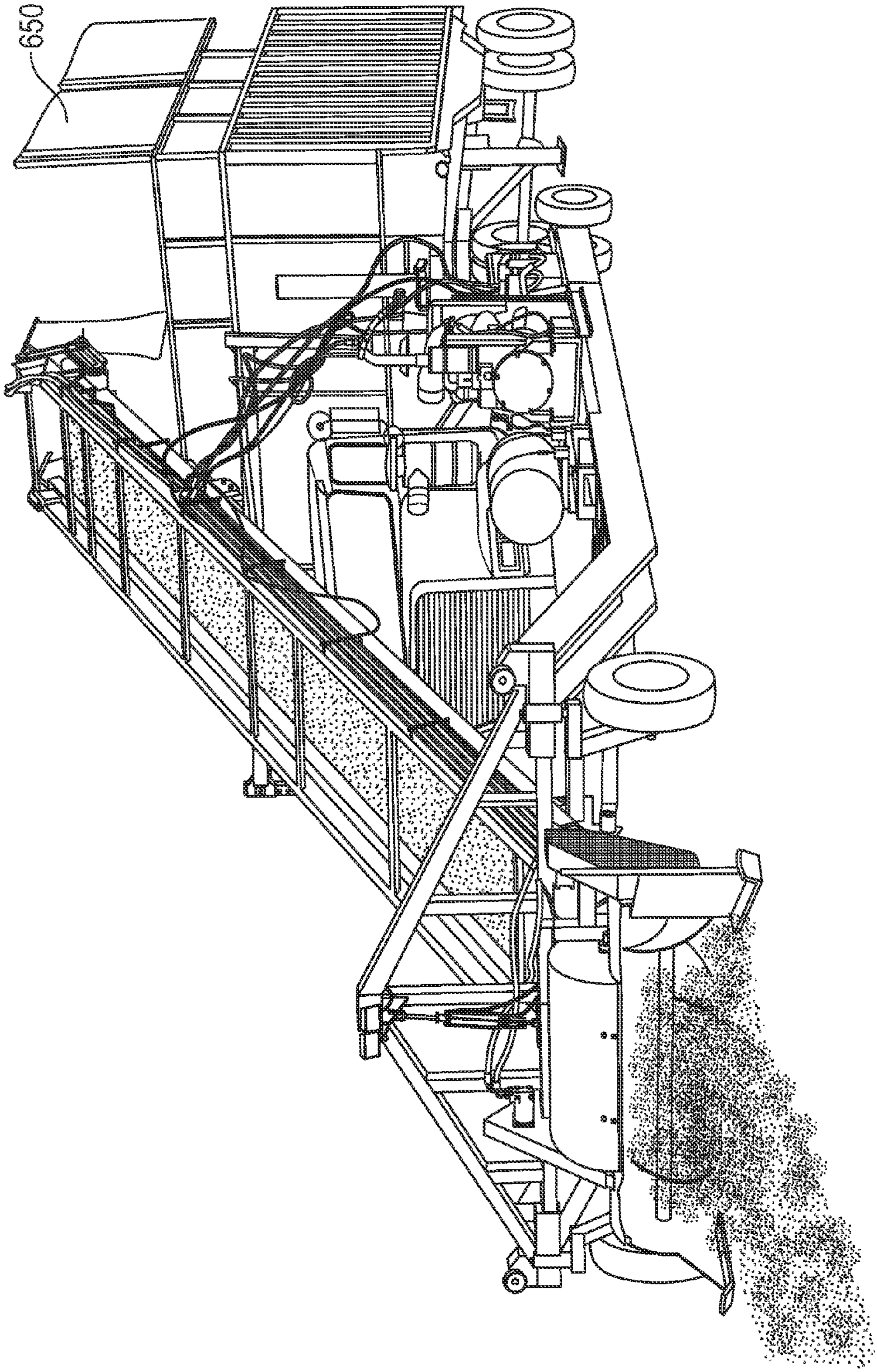
FIG. 23 is a perspective view of a collector system and collection truck

FIG. 23 depicts a collection truck connected with a collector system. The collection truck comprises a pair of extended side walls 650. The extended sidewalls provide an advantage of defining a void for the back end of the conveyer belt such that dumped material stays in the collection truck and does not fall back upon the asphalt.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A system of distributing, mixing and drying agricultural products, the system comprising:

a) a spreader trailer system comprising internal sidewalls attached to a floor surface with the floor surface supporting a belt drive assembly, the belt drive assembly comprising a plurality of flat conveyer bars, the spreader trailer system further comprising first and second horizontal rotational bars attached to the internal sidewalls, with each horizontal rotational bar comprising a plurality of breakup tines, the spreader trailer further comprising an angled back plate supported by the floor surface, and two rotational plates positioned below the floor surface and aligned with voids defined by the floor surface, the rotational plates comprising ribs;

b) a drag bar system comprising a trailer assembly attached to a plurality of angled attachment bars and a plurality of drag bar assemblies attached to the angled attachment bars, each angled attachment bar comprises a horizontal bar attached to a first angled bar and a second angled bar.

2. The system of claim 1 wherein the spreader trailer system further comprises rotational motors attached to each rotational plate.

3. The system of claim 1 with a diversion shield fastened behind each rotational plate.

4. The system of claim 3 with a curved center shield fastened between the diversion shields.

5. The system of claim 1 with a cross bar assembly attached to the drag bar assembly of the drag bar system.

6. The system of claim 1 including a windrow construction system comprising a trailer assembly attached to cross bar and a plurality of angled attachment bars attached to the cross bar and a plurality of cultivator systems attached to the angled attachment bars, with each cultivator system comprising a diversion connector bar attached to a plurality of diversion bars with each diversion bar comprising a diversion bar body attached to a lower lip and an upper lip.

7. The system of claim 1 including a fluffer system comprising a plurality of attachment bars attached to an aeration assembly and a lower cross bar assembly with the aeration assembly comprising a rotational shaft attached to a plurality of mixing flat rods and with the lower cross bar assembly comprising a flat ground bar.

8. The system of claim 7 wherein a pivot blocks are attached to the lower cross bar assembly.

9. The system of claim 1 including a conveyer collection system comprising an auger collection assembly comprising an auger, fanned collection guide, compact collection guide, offset frame and a conveyer belt.

10. A method of drying agricultural products the method comprising the steps of:

a) using a spreader trailer system to spread an agricultural product over asphalt;

b) using a drag bar system to break up and aerate the agricultural product;

c) using a fluffer system to further break up and aerate the agricultural product;

d) using a windrow construction system to create windrows of agricultural product over the asphalt leaving bear asphalt between the windrows allowing heat to radiate upon the sides of the windrows and allowing the bear asphalt to absorb heat; and e) using a collection conveyer system to move the agricultural product into a collection truck.

* * * * *